US009983014B2

(12) United States Patent
Kitajima et al.

(10) Patent No.: US 9,983,014 B2
(45) Date of Patent: May 29, 2018

(54) TRAVEL ROUTE GUIDE DEVICE, TRAVEL ROUTE GUIDE SYSTEM, TRAVEL ROUTE GUIDE METHOD AND PROGRAM

(71) Applicant: MITSUBISHI HEAVY INDUSTRIES, LTD., Tokyo (JP)

(72) Inventors: Kazuyoshi Kitajima, Tokyo (JP); Takashi Saito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 27 days.

(21) Appl. No.: 15/033,104

(22) PCT Filed: Oct. 29, 2014

(86) PCT No.: PCT/JP2014/078727
§ 371 (c)(1),
(2) Date: Apr. 28, 2016

(87) PCT Pub. No.: WO2015/064619
PCT Pub. Date: May 7, 2015

(65) Prior Publication Data
US 2016/0265929 A1   Sep. 15, 2016

(30) Foreign Application Priority Data

Oct. 31, 2013   (JP) ................................ 2013-226264
Nov. 27, 2013   (JP) ................................ 2013-245246

(51) Int. Cl.
*G01C 21/00*   (2006.01)
*G01C 21/34*   (2006.01)
(Continued)

(52) U.S. Cl.
CPC ...... *G01C 21/3469* (2013.01); *B60L 11/1861* (2013.01); *G01C 21/3415* (2013.01);
(Continued)

(58) Field of Classification Search
CPC ............ G01C 21/3469; G01C 21/3415; B60L 11/1861; G08G 1/096827; G08G 1/096844; G09B 29/00; G09B 29/10
(Continued)

(56) References Cited

U.S. PATENT DOCUMENTS 5,408,415 A * 4/1995 Inoue ................. G01C 21/3655
340/990
6,101,443 A    8/2000 Kato et al.
(Continued)

FOREIGN PATENT DOCUMENTS

DE    102011015778 A1    10/2012
JP    2001-141490 A      5/2001
(Continued)

OTHER PUBLICATIONS

Extended European Search Report in EP Application No. 14858244. 8, dated Jan. 23, 2017.
(Continued)

*Primary Examiner* — Shardul D Patel
(74) *Attorney, Agent, or Firm* — Hauptman Ham, LLP

(57) ABSTRACT

A travel route guide device includes a travel route calculation unit that calculates a travel route from a current position to a destination based on current position information, destination information, and a remaining amount of power of an electric vehicle, and information on a remaining power amount recovery facility. The travel route guide device includes a region division unit that divides a region including the travel route calculated by the travel route calculation unit into a plurality of local regions. The travel route device includes a constraint condition determination unit that determines a constraint condition for a monitoring variable. The travel route device includes a recalculation determination unit that monitors the monitoring variable corresponding to
(Continued)

the local region including a position of the electric vehicle, and requests the travel route calculation unit to calculate the travel route when a value of the monitoring variable deviates from the constraint condition.

12 Claims, 8 Drawing Sheets

(51) Int. Cl.
| | |
|---|---|
| G09B 29/00 | (2006.01) |
| G09B 29/10 | (2006.01) |
| B60L 11/18 | (2006.01) |
| G08G 1/0968 | (2006.01) |

(52) U.S. Cl.
CPC . *G08G 1/096827* (2013.01); *G08G 1/096844* (2013.01); *G09B 29/00* (2013.01); *G09B 29/10* (2013.01); *B60L 2240/622* (2013.01); *B60L 2250/16* (2013.01); *B60L 2260/52* (2013.01); *B60L 2260/54* (2013.01); *Y02T 10/7005* (2013.01); *Y02T 10/705* (2013.01); *Y02T 10/7044* (2013.01); *Y02T 10/7291* (2013.01); *Y02T 10/92* (2013.01); *Y02T 90/16* (2013.01); *Y02T 90/161* (2013.01); *Y02T 90/162* (2013.01)

(58) Field of Classification Search
USPC ....... 701/424, 437, 530, 553, 31.4; 340/990, 340/995.1, 995.21, 995.27
See application file for complete search history.

(56) References Cited

U.S. PATENT DOCUMENTS

| | | | | |
|---|---|---|---|---|
| 8,880,238 | B2* | 11/2014 | Reich | G01C 21/3469 701/1 |
| 2010/0138098 | A1* | 6/2010 | Takahara | B60L 11/123 701/31.4 |
| 2014/0163877 | A1* | 6/2014 | Kiyama | G01C 21/3469 701/533 |
| 2015/0127248 | A1* | 5/2015 | Fisher | B60L 11/1861 701/414 |
| 2015/0142305 | A1* | 5/2015 | Kubo | G09B 29/106 701/439 |

FOREIGN PATENT DOCUMENTS

| | | |
|---|---|---|
| JP | 2002-243478 A | 8/2002 |
| JP | 2003-262525 A | 9/2003 |
| JP | 2004-239757 A | 8/2004 |
| JP | 2011-145170 A | 7/2011 |
| JP | 2011-185785 A | 9/2011 |
| JP | 5017398 B | 6/2012 |
| JP | 2013-152149 A | 8/2013 |
| WO | 2013/013729 A1 | 1/2013 |

OTHER PUBLICATIONS

International Search Report in PCT Application No. PCT/JP2014/078727, dated Jan. 20, 2015.
Written Opinion in PCT Application No. PCT/JP2014/078727, dated Jan. 20, 2015.
Office Action in SG Application No. 11201603329Q, dated Aug. 22, 2016.

* cited by examiner

TRAVEL ROUTE GUIDE DEVICE, TRAVEL ROUTE GUIDE SYSTEM, TRAVEL ROUTE GUIDE METHOD AND PROGRAM

RELATED APPLICATIONS

The present application is a National Phase of PCT/JP2014/078727, filed Oct. 29, 2014, and claims priority based on Japanese Patent Applications No. 2013-226264, filed Oct. 31, 2013 and No. 2013-245246, filed Nov. 27, 2013.

TECHNICAL FIELD

The present invention relates to a travel route guide device, a travel route guide system, a travel route guide method and a program that guide a travel route from a departure point to a destination of an electric vehicle.

Priorities are claimed on Japanese Patent Application No. 2013-226264, filed Oct. 31, 2013 and Japanese Patent Application No. 2013-245246, filed Nov. 27, 2013, the contents of which are incorporated herein by reference.

BACKGROUND ART

In general, an electric vehicle has a shorter traveling distance than a car having an internal combustion engine. Therefore, when the electric vehicle is used, it is necessary for a driver to travel to a destination while going by way of charging equipment at relatively short intervals.

As a technology for calculating a travel route from a departure point to a destination of an electric vehicle, a method of calculating a travel route including going through charging equipment, as necessary, in consideration of information on the departure point and the destination, as well as a remaining amount of power of the electric vehicle or position information of the charging equipment is known (for example, Patent Literature 1).

CITATION LIST

Patent Literature

[Patent Literature 1] Japanese Unexamined Patent Application, First Publication No. 2011-185785

SUMMARY OF INVENTION

Technical Problem

After the electric vehicle begins to travel along the travel route calculated using the method as described above, the electric vehicle may travel outside the travel route or a change in a situation of the travel route may occur. In this case, the electric vehicle is likely to consume power at a rate exceeding a rate assumed at the time of calculation of the travel route. Accordingly, even when the electric vehicle then travels along a travel route calculated again, the electric vehicle is unlikely to arrive at charging equipment. To prevent such problems, a method of recalculating the travel route at any time while the electric vehicle is traveling is effective.

However, if the travel route is recalculated at any time, an excessive calculation load is generated.

The present invention provides a travel route guide device, a travel route guide system, a travel route guide method, and a program capable of performing recalculation of a travel route while suppressing a calculation load.

Solution to Problem

According to a first aspect of the present invention, a travel route guide device includes: a travel route calculation unit configured to calculate a travel route from a current position to a destination based on current position information, destination information, and a remaining amount of power of an electric vehicle, and information on a remaining power amount recovery facility; a region division unit configured to divide a region including the travel route calculated by the travel route calculation unit into a plurality of local regions; a constraint condition determination unit configured to determine a constraint condition for a monitoring variable related to power consumption, for each of the local regions divided by the region division unit; and a recalculation determination unit configured to monitor, for a traveling electric vehicle, the monitoring variable corresponding to the local region including a position of the electric vehicle, and request the travel route calculation unit to calculate the travel route when a value of the monitoring variable deviates from the constraint condition.

The above-described travel route guide device performs recalculation of the travel route only when the value of the monitoring variable in each local region deviates from the constraint condition.

In the above-described travel route guide device, the monitoring variable may be either or both of an amount of power consumption and travel time.

Accordingly, the travel route guide device performs recalculation of the travel route when excessive power consumption or prolongation of travel time occurs in each local region.

In the above-described travel route guide device, the region division unit may divide a region including the travel route calculated by the travel route calculation unit into a plurality of local regions having a planar shape.

Accordingly, the travel route guide device can suppress a calculation load in the region division unit.

In the above-described travel route guide device, the region division unit may divide the region so that the plurality of local regions have the same shape.

Accordingly, the travel route guide device can further suppress the calculation load in the region division unit.

In the above-described travel route guide device, the region division unit may divide the region so that the plurality of local regions have the same area.

Accordingly, the travel route guide device can further suppress the calculation load in the region division unit.

In the above-described travel route guide device, the region division unit may divide a region including the travel route calculated by the travel route calculation unit into a plurality of local regions having a shape or an area according to a situation of the travel route.

Accordingly, the travel route guide device can perform the determination of the constraint conditions in each local region more appropriately.

In the above-described travel route guide device, the situation of the travel route may be either or both of a shape of the route and a congestion situation of the route.

Accordingly, the travel route guide device can perform the region division in consideration of both of a static situation and a dynamic situation of the travel route.

In the above-described travel route guide device, the recalculation determination unit may request the travel route calculation unit to calculate the travel route when a position of the electric vehicle is not included in any of the local regions.

Accordingly, the travel route guide device performs recalculation of the travel route when the electric vehicle is traveling in a region excessively deviating from the travel route.

In the above-described travel route guide device, the constraint condition determination unit may predetermine the constraint condition based on a driving history of the electric vehicle.

Accordingly, the travel route guide device can determine the constraint conditions more appropriately according to characteristics of a driver of the electric vehicle.

According to a second aspect of the present invention, a travel route guide system includes a management center device configured to manage a drive of an electric vehicle, and an on-board unit mounted in the electric vehicle. The management center device includes a management center side reception unit configured to receive electric vehicle information including current position information, destination information, and a remaining amount of power of the electric vehicle from the on-board unit; a travel route calculation unit configured to calculate a travel route from a current position to a destination of the electric vehicle based on the electric vehicle information received by the management center-side reception unit and information on a remaining power amount recovery facility; a region division unit configured to divide a region including a travel route calculated by the travel route calculation unit into a plurality of local regions; a constraint condition determination unit configured to determine a constraint condition for a monitoring variable related to power consumption for each of the local regions divided by the region division unit; and a management center side transmission unit configured to transmit management center processing information including the travel route calculated by the travel route calculation unit, the local regions divided by the region division unit, and the constraint condition for the monitoring variable determined by the constraint condition determination unit to the on-board unit. The on-board unit includes an on-board unit side transmission unit configured to transmit the electric vehicle information to the management center device; an on-board unit side reception unit configured to receive the management center processing information from the management center device; and a retransmission determination unit configured to monitor the monitoring variable corresponding to the local region including a position of the electric vehicle based on the management center processing information received by the on-board unit side reception unit, and request the on-board unit side transmission unit to transmit the electric vehicle information to the management center device when a value of the monitoring variable deviates from the constraint condition.

According to a third aspect of the present invention, a travel route guide system includes a management center device configured to manage an operation of an electric vehicle, and an on-board unit mounted in the electric vehicle. The travel route guide system includes a travel route calculation unit configured to calculate a travel route from a current position to a destination based on current position information, destination information and a remaining amount of power of the electric vehicle, and information on a remaining power amount recovery facility; a region division unit configured to divide a region including the travel route calculated by the travel route calculation unit into a plurality of local regions; a constraint condition determination unit configured to determine a constraint condition for a monitoring variable related to power consumption, for each of the local regions divided by the region division unit; and a recalculation determination unit configured to monitor, for a traveling electric vehicle, the monitoring variable corresponding to the local region including a position of the electric vehicle, and request the travel route calculation unit to calculate the travel route when a value of the monitoring variable deviates from the constraint condition. The travel route calculation unit, the region division unit, the constraint condition determination unit, and the recalculation determination unit are distributed across the management center device and the on-board unit.

According to a fourth aspect of the present invention, a travel route guide method includes a travel route calculation step of calculating a travel route from a current position to a destination based on current position information, destination information, and a remaining amount of power of an electric vehicle, and information on a remaining power amount recovery facility; a region division step of dividing a region including the travel route calculated in the travel route calculation step into a plurality of local regions; a constraint condition determination step of determining a constraint condition for a monitoring variable related to power consumption, for each of the local regions divided in the region division step; and a recalculation determination step of monitoring, for a traveling electric vehicle, the monitoring variable corresponding to the local region including a position of the electric vehicle, and determining that the travel route calculation step is to be performed again when a value of the monitoring variable deviates from the constraint condition.

According to a fifth aspect of the present invention, a program causes a computer of a travel route guide device to function as a travel route calculation device configured to calculate a travel route from a current position to a destination based on current position information, destination information and a remaining amount of power of the electric vehicle, and information on a remaining power amount recovery facility; a region division device configured to divide a region including the travel route calculated by the travel route calculation device into a plurality of local regions; a constraint condition determination device configured to determine a constraint condition for a monitoring variable related to power consumption, for each of the local regions divided by the region division device; and a recalculation determination device configured to monitor, for a traveling electric vehicle, the monitoring variable corresponding to the local region including a position of the electric vehicle, and request the travel route calculation device to calculate the travel route when a value of the monitoring variable deviates from the constraint condition.

Advantageous Effects of Invention

According to the travel route guide device, the travel route guide system, and the travel route guide method described above, it is possible to perform the recalculation of the travel route while suppressing the calculation load.

DESCRIPTION OF EMBODIMENTS

First Embodiment

Hereinafter, a first embodiment of the present invention will be described with reference to FIGS. 1 to 6.

Figure 1:
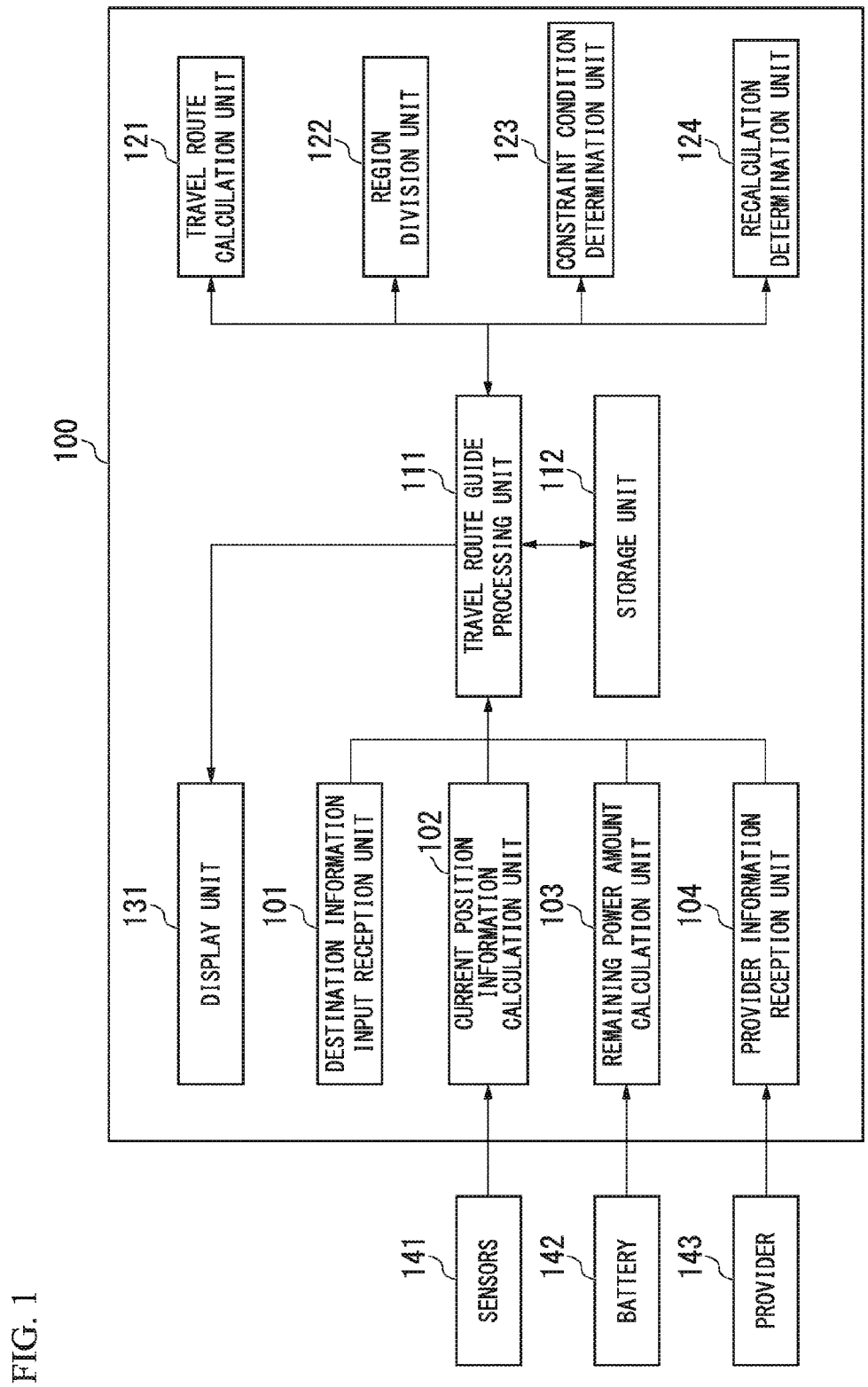
FIG. 1 is an entire block diagram of a travel route guide device according to a first embodiment.

FIG. 1 is a diagram illustrating an entire configuration of a travel route guide device of a first embodiment of the present invention. The travel route guide device 100 includes a destination information input reception unit 101, a current position information calculation unit 102, a remaining power amount calculation unit 103, a provider information reception unit 104, a travel route guide processing unit 111, a storage unit 112, a travel route calculation unit 121, a region division unit 122, a constraint condition determination unit 123, a recalculation determination unit 124, and a display unit 131.

Further, the travel route guide device 100 is connected to sensors 141, a battery 142, and a provider 143.

The travel route guide device 100 is a device included in an on-board unit that is installed in a vehicle.

The destination information input reception unit 101 receives a destination information input by an occupant of an electric vehicle. The destination information input reception unit 101 outputs the received destination information indicating longitude and latitude information to the travel route guide processing unit 111.

The current position information calculation unit 102 calculates current position information indicating longitude and latitude information from measurement values obtained by the sensors 141. The current position information calculation unit 102 outputs the calculated current position information to travel route guide processing unit 111.

The sensors 141 are devices that measure information useful for calculation of current position information, such as various navigation satellite system (NSS) antennas, an acceleration sensor, or an angular velocity sensor. The sensors 141 output a measured value to the current position information calculation unit 102 at any time.

The remaining power amount calculation unit 103 monitors an amount of remaining power of the battery 142, and outputs the amount of remaining power to the travel route guide processing unit 111.

The provider information reception unit 104 receives road traffic information, remaining power amount recovery facility information, or the like distributed by the provider 143, and outputs this information to the travel route guide processing unit 111.

The provider 143 distributes the road traffic information including a road situation such as an accident, construction, or congestion, and the remaining power amount recovery facility information including position information or a use situation of charging equipment or a battery exchange facility for an electric vehicle, a vehicle exchange facility, or the like.

The travel route guide processing unit 111 appropriately records the destination information, the current position information, the remaining amount of power, and the road traffic information and the remaining power amount recovery facility information respectively received from the destination information input reception unit 101, the current position information calculation unit 102, the remaining power amount calculation unit 103, and the provider information reception unit 104 in the storage unit 112.

Further, the travel route guide processing unit 111 instructs respective operations of the travel route calculation unit 121, the region division unit 122, the constraint condition determination unit 123, and the recalculation determination unit 124, outputs information required for the respective operations from the storage unit 112, receives information output as a result of the respective operations, or stores the information in the storage unit 112 as necessary.

Further, the travel route guide processing unit 111 appropriately outputs the information stored in the storage unit 112 to the display unit 131.

The storage unit 112 is a storage means such as a hard disk or a flash memory. The storage unit 112 receives various types of information output from the destination information input reception unit 101, the current position information calculation unit 102, the remaining power amount calculation unit 103, the provider information reception unit 104, the travel route calculation unit 121, the region division unit 122, the constraint condition determination unit 123, and the recalculation determination unit 124 via the travel route guide processing unit 111, and stores the information.

Further, the storage unit 112 stores map information in advance.

The travel route calculation unit 121 receives the destination information, the current position information, the remaining power amount, the remaining power amount recovery facility information, and the map information from the travel route guide processing unit 111, calculates a travel route from the current position to the destination at which an electric vehicle can arrive, plots the calculated travel route in the map information, and outputs the resultant information to the travel route guide processing unit 111 as the travel route information. The travel route calculated by the travel route calculation unit 121 may be a travel route going through the remaining power amount recovery facility.

The region division unit 122 receives the travel route information output by the travel route calculation unit 121 from the travel route guide processing unit 111, divides a region including the travel route into a plurality of local regions, and outputs a result of the division to the travel route guide processing unit 111 as local region information.

The constraint condition determination unit 123 receives the local region information output by the region division unit 122 from the travel route guide processing unit 111, determines constraint conditions for a monitoring variable related to power consumption in each local region, and outputs the determined constraint conditions to the travel route guide processing unit 111.

The monitoring variable related to the power consumption refers to all variables having a correlation with the power consumption of the electric vehicle.

The recalculation determination unit 124 receives the current position information, the local region information output by the region division unit 122, and the constraint conditions and a value of the monitoring variable related to power consumption output by the constraint condition determination unit 123 from the travel route guide processing unit 111, determines whether recalculation of the travel route of the traveling vehicle (electric vehicle) is necessary, and outputs a result of the determination to the travel route guide processing unit 111.

The display unit 131 is a display device such as a liquid crystal display. The display unit 131 displays information such as the map information, the current position information, the destination information, the road traffic information, the remaining power amount, and the remaining power amount recovery facility information output from the travel route guide processing unit 111.

Figure 2:
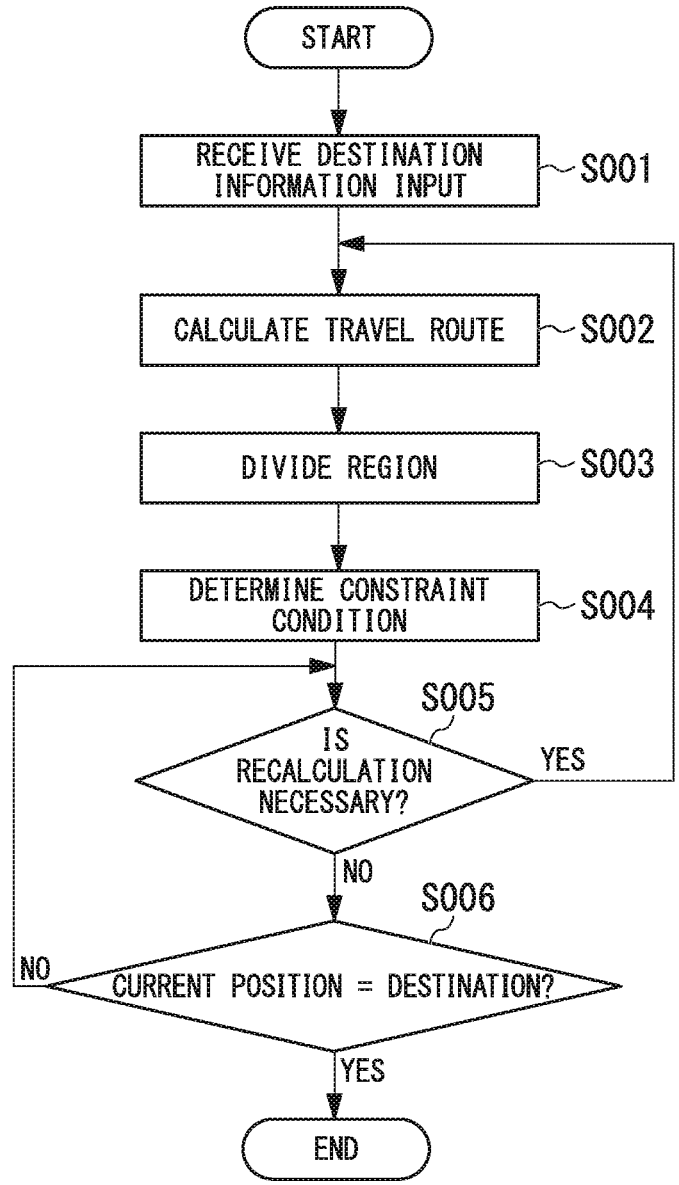
FIG. 2 is an operation flowchart of the travel route guide device according to the first embodiment.

Next, an operation of the travel route guide device 100 in the first embodiment will be described with reference to FIG. 2. FIG. 2 is an operation flowchart of the travel route guide device 100.

First, the destination information input reception unit 101 receives the destination information input by an occupant of the electric vehicle, and outputs the received destination information to the travel route guide processing unit 111 (S001).

Then, the travel route calculation unit 121 operates according to an instruction of the travel route guide processing unit 111 and calculates a travel route (S002).

Figure 3:
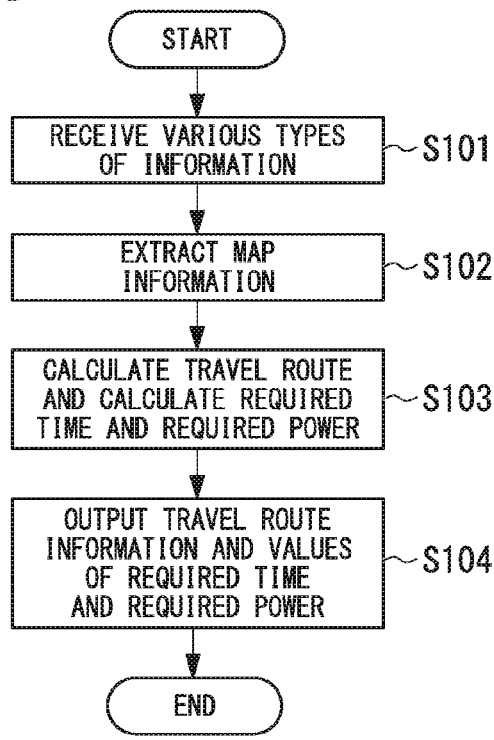
FIG. 3 is an operation flowchart of a travel route calculation unit in the first embodiment.

Here, an operation of the travel route calculation unit 121 will be described with reference to FIG. 3. FIG. 3 is an operation flowchart of the travel route calculation unit 121.

The travel route calculation unit 121 receives the destination information, the current position information, the remaining power amount, the remaining power amount recovery facility information, and the map information from the travel route guide processing unit 111 (S101). In this case, the travel route guide processing unit 111 acquires the current position information from the current position information calculation unit 102. The destination information or the current position information indicates, for example, coordinates (latitude and longitude) of the destination or the current position. Further, the travel route guide processing unit 111 acquires the remaining power amount from the remaining power amount calculation unit 103. Further, the travel route guide processing unit 111 acquires the power recovery facility information and the map information from the storage unit 112.

Then, the travel route calculation unit 121 extracts the map information in a necessary range from among the map information acquired from the travel route guide processing unit 111 based on the current position information and the destination information (S102).

More specifically, the travel route calculation unit 121 extracts map information in a range including coordinates indicated by the destination information and coordinates indicated by the current position information.

The travel route calculation unit 121 calculates the travel route connecting the coordinates indicated by the current position information to the coordinates indicated by the destination information using a known scheme such as Dijkstra's algorithm (S103). In this case, the travel route calculation unit 121 considers not only the destination information or the current position information, but also information such as the remaining amount of power or the remaining power amount recovery facility information. Accordingly, the travel route calculation unit 121 appropriately calculates the travel route through the remaining power amount recovery facility so that the electric vehicle arrives at the destination without occurrence of a power shortage. Further, in this case, the travel route calculation unit 121 calculates values of required time and required power for traveling along the calculated travel route (S103). For example, the travel route calculation unit 121 predicts an average velocity V when the electric vehicle travels along the calculated travel route from the road traffic information or a shape of the travel route, and calculates a value obtained by dividing a distance L of the travel route by the average velocity as the required time T. A calculation equation for the required time T is Equation (1).

$$T = L/V \tag{1}$$

Further, the travel route calculation unit 121 calculates a required power P from the predicted average velocity V, a representative road gradient θ of the travel route, and a representative distance 1. An equation for calculating the required power P is Equation (2).

$$P = \alpha \cdot V^2 + \beta \cdot \sin \theta \cdot 1 \tag{2}$$

Here, $\alpha$ is a coefficient for converting the average velocity V into power consumption, and $\beta$ is a coefficient for converting the road gradient into power consumption. In Equation (2), "$\alpha \cdot V^2$" in the first item represents kinetic energy, and "$\beta \cdot \sin \theta \cdot 1$" in the second item represents potential energy. Further, in Equation (2), θ and 1 are representative values derived from a start point and an end point of the travel route. For example, θ may be an angle formed between a straight line connecting coordinates (x1, y1, z1) of the start point to coordinates (x2, y2, z2) of the end point and a ground surface (plane). Further, 1 may be a straight-line distance between the start point and the end point.

Finally, the travel route calculation unit 121 outputs the travel route information including the current position information, the destination information, the map information extracted in step S102, coordinate information indicating the calculated travel route on the map information, or the like, and values of required time and required power for traveling along the travel route to the travel route guide processing unit 111 (S104).

After the operation of the travel route calculation unit 121 is completed, the region division unit 122 operates according to an instruction of the travel route guide processing unit 111, and performs a region division process (S003).

Figure 4:
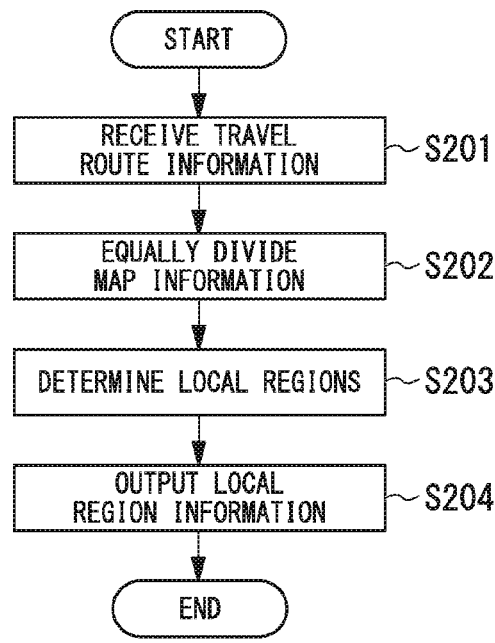
FIG. 4 is an operation flowchart of a region division unit in the first embodiment.
Figure 5A:
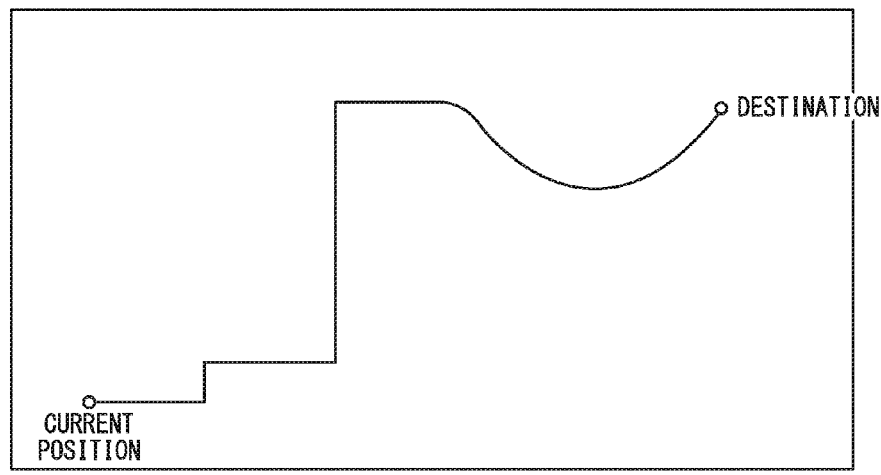
FIG. 5A is a diagram illustrating travel route information and local region information in the first embodiment.
Figure 5B:
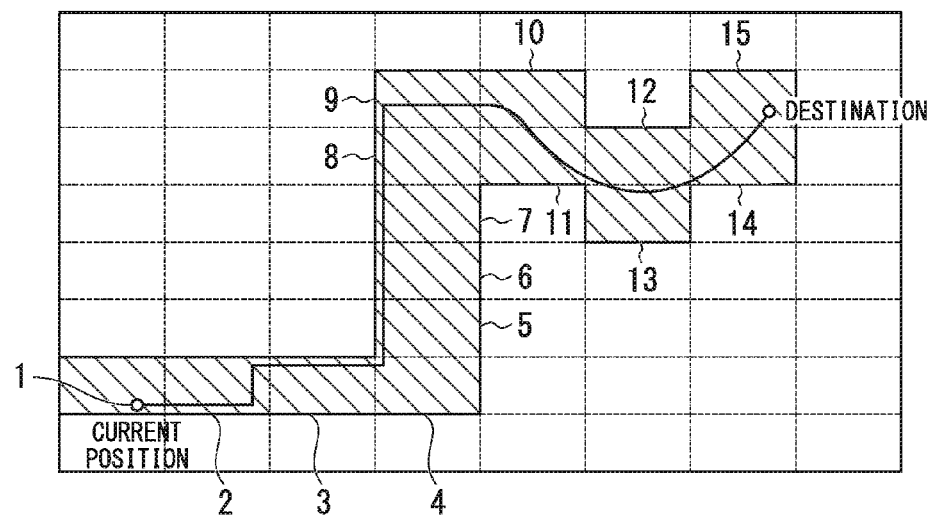
FIG. 5B is a diagram illustrating travel route information and local region information in the first embodiment.

Here, the operation of the region division unit 122 will be described with reference to FIGS. 4, 5A, and 5B. FIG. 4 is an operation flowchart of the region division unit 122. FIG. 5A is a diagram illustrating the travel route information. FIG. 5B is a diagram illustrating the local region information.

First, the region division unit 122 receives the travel route information output by the travel route calculation unit 121 from the travel route guide processing unit 111 (S201).

Then, the region division unit 122 equally divides entire map information included in the travel route information in a predetermined number (for example, 8 horizontally and 8 vertically) (S202).

Then, the region division unit 122 determines all regions including at least a portion of the travel route among a plurality of rectangular regions obtained through the equal division, as local regions (S203). In FIG. 5B, the plurality of rectangular regions obtained through the equal division are shown by dashed lines, and a plurality of rectangular regions surrounded by a solid line and hatched are the determined local regions 1 to 15. The region division unit 122 adds identification information 1 to 15 to the respective local regions in passage order of the travel route.

Finally, the region division unit 122 adds information in which coordinates of four vertexes of each of the local regions 1 to 15 determined in S203 are associated with the identification information of each local region to the travel route information, and outputs the resultant information to the travel route guide processing unit 111 as the local region information (S204).

After the operation of the region division unit 122 is completed, the constraint condition determination unit 123 operates according to an instruction of the travel route guide processing unit 111 and performs a constraint condition determination process (S004). In this embodiment, the constraint condition is that values of monitoring variables do not exceed certain upper limits, in which the monitoring variables are a travel time and an amount of power consumption in each local region.

First, the constraint condition determination unit 123 receives the local region information output by the region division unit 122, and the values of the required time and the required power for traveling along the travel route output by the travel route calculation unit 121 from the travel route guide processing unit 111.

Then, the constraint condition determination unit 123 divides the received value of the required time by the number of local regions included in the local region information, and uses a resultant value as an upper limit value in the constraint condition for the travel time which is a monitoring variable, in the entire local region. Further, the constraint condition determination unit 123 divides the received value of the required power by the number of local regions included in the local region information, and uses a resultant value as an upper limit value in the constraint condition for the amount of power consumption which is a monitoring variable, in the entire local region.

Finally, the constraint condition determination unit 123 outputs the constraint conditions for the calculated travel time and the calculated amount of power consumption to the travel route guide processing unit 111.

As the operation of the constraint condition determination unit 123 is completed and the electric vehicle starts traveling along the travel route, the recalculation determination unit 124 operates according to an instruction of the travel route guide processing unit 111 and determines whether the recalculation of the travel route is necessary (S005).

Figure 6:
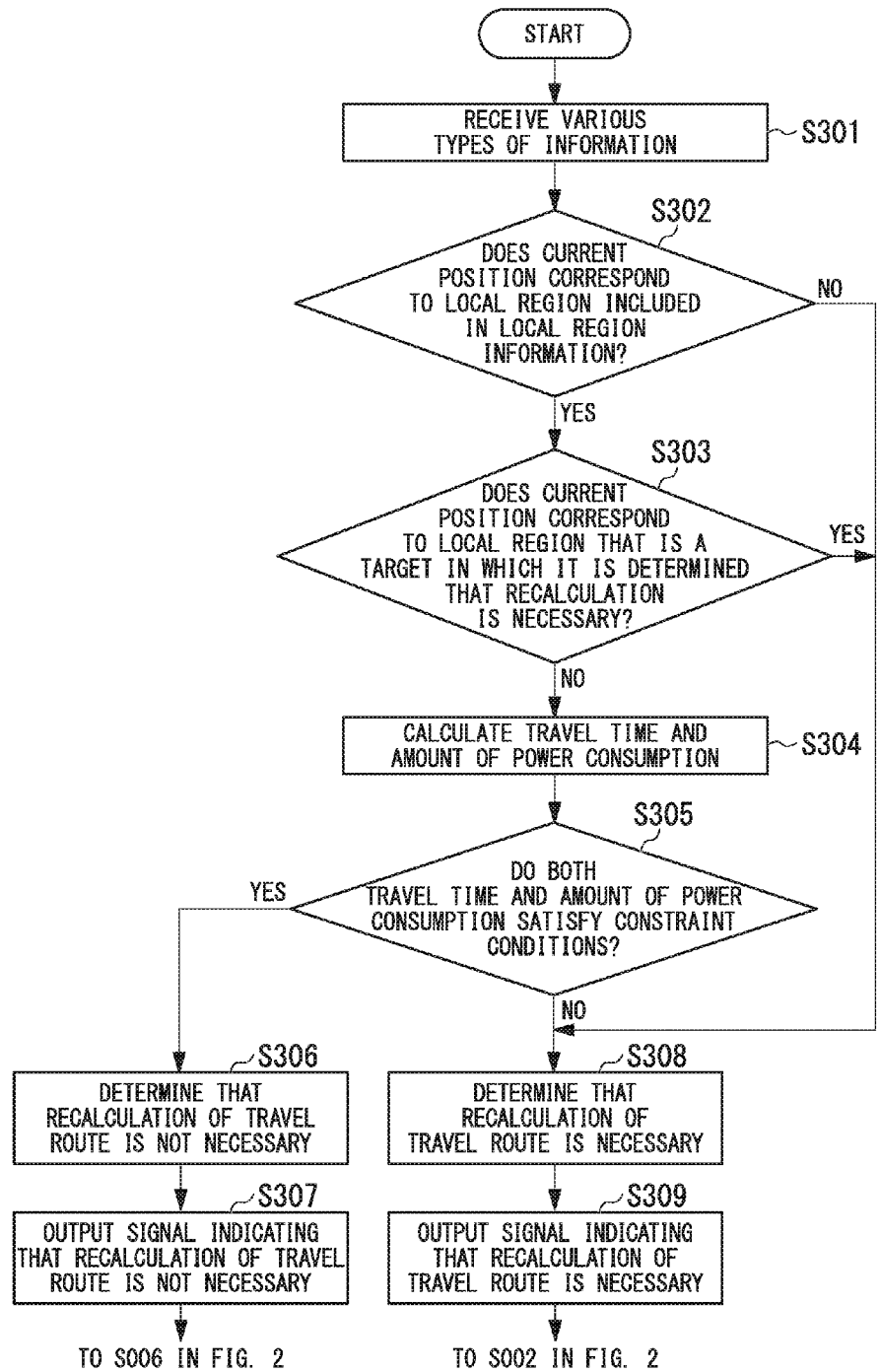
FIG. 6 is an operation flowchart of a recalculation determination unit in the first embodiment.

Here, the operation of the recalculation determination unit 124 will be described with reference to FIG. 6. FIG. 6 is an operation flowchart of the recalculation determination unit 124.

First, the recalculation determination unit 124 receives the current position information, the local region information output by the region division unit 122, and the constraint conditions of a travel time and an amount of power consumption which are monitoring variables output by the constraint condition determination unit 123 from the travel route guide processing unit 111 (S301).

Then, the recalculation determination unit 124 determines whether the current position corresponds to a local region included in the local region information based on the current position information (S302). More specifically, the recalculation determination unit 124 determines whether coordinates of the current position are included in any of the regions surrounded by four vertices in the respective local regions 1 to 15 included in the local region information.

In some schemes of the division into the local regions in the region division unit 122, ranges of different local regions may partially overlap. If the current position is included in the ranges of both of a local region determined to include the current position within its range in a previous recalculation determination and a local region corresponding to the identification information with the next number, the recalculation determination unit 124 determines that the current position corresponds to the local region determined in the previous recalculation determination.

Further, if a result of the determination in step S302 is Yes, the recalculation determination unit 124 determines whether the current position corresponds to a local region that is a target in which it is determined that the travel route recalculation is necessary (S303). If the current position satisfies condition (a1) below, the recalculation determination unit 124 determines that the current position corresponds to the local region that is a target in which it is determined that the travel route recalculation is necessary, and the operation of the recalculation determination unit 124 proceeds to S308, which will be described below.

(a1) The current position does not correspond to any of the local region determined to include the current position within its range in the previous recalculation determination and the local region corresponding to the identification information with the next number.

Then, the recalculation determination unit 124 calculates a travel time elapsed since the electric vehicle entered the local region determined in S302, and an amount of power consumption (S304). More specifically, the recalculation determination unit 124 receives a time at which the electric vehicle first enters the current local region and a remaining amount of power at that time, which are recorded in the storage unit 112, from the travel route guide processing unit 111, and calculates a time difference between the time at which the electric vehicle enters the local region and the current time, and a remaining amount difference between the remaining amount of power when the electric vehicle enters the local region and the current remaining amount of power to calculate the travel time elapsed since the electric vehicle entered the local region, and the amount of power consumption. If the local region corresponding to the current position determined in S302 is a local region including the start point of the travel route, the recalculation determination unit 124 calculates the travel time elapsed since the start of travel route guidance, and the amount of power consumption.

Then, the recalculation determination unit 124 determines whether both of the travel time and the amount of power consumption calculated in S304 are values satisfying the constraint conditions in the corresponding local region received in S301 (S305).

If the recalculation determination unit 124 determines in S305 that both of the travel time and the amount of power consumption calculated in step S304 satisfy the constraint conditions received in S301, the recalculation determination unit 124 determines that the recalculation of the travel route is not necessary (S306 and S005; No). If the recalculation determination unit 124 determines that the recalculation of the travel route is not necessary, the recalculation determination unit 124 outputs a signal indicating that the recalculation of the travel route is not necessary to the travel route guide processing unit 111 (S307). If the recalculation determination unit 124 determines in S305 that any one of the travel time and the amount of power consumption calculated in step S304 deviates from the constraint conditions received in S301, if the current position does not correspond to the local region included in the local region information in S302, or if the current position does not satisfy the condition (a1) in S303, the recalculation determination unit 124 determines that the recalculation of the travel route is necessary (S308, S005; Yes). If the recalculation determination unit 124 determines that the recalculation of the travel route is necessary, the recalculation determination unit 124 outputs a signal indicating that the recalculation of the travel route is necessary to the travel route guide processing unit 111 (S309).

In S306, if the recalculation determination unit 124 determines that the recalculation of the travel route is necessary (Yes in S005), the travel route guide processing unit 111 returns the operation of the travel route guide device 100 to S002.

In S306, if the recalculation determination unit 124 determines that the recalculation of the travel route is not necessary (No in S005), the travel route guide processing unit 111 compares the current position information with the destination information to determine whether or not the current position information and the destination information match (S006).

In S006, if the travel route guide processing unit 111 determines that the current position and the destination do not match (No in S006), the travel route guide processing unit 111 returns the operation of the travel route guide device 100 to S005.

In S006, if the travel route guide processing unit 111 determines that the current position and the destination match (Yes in S006), the travel route guide device 100 ends the operation (S007).

According to the travel route guide device 100 as described above, since the recalculation determination unit 124 performs the recalculation of the travel route when the value of the monitoring variable deviates from the constraint conditions in each local region, it is possible to suppress a calculation load related to the recalculation of the travel route.

Further, in this embodiment, the recalculation determination unit 124 uses the amount of power consumption and the travel time as the monitoring variables. Accordingly, it is possible to detect excessive power consumption or prolongation of the travel time in each local region. Such events have a significant influence on whether or not the electric vehicle arrives at power recovery equipment. From the above, according to the travel route guide device 100 of this embodiment, it is possible to detect a case in which the recalculation of the travel route is necessary with higher precision and to suppress recalculation of an unnecessary travel route.

Further, in this embodiment, the region division unit 122 divides the region including the travel route into the plurality of local regions having a planar shape. Therefore, it is possible to suppress a calculation load related to the region division, as compared with a case in which the region is divided into three-dimensional shapes.

Further, in this embodiment, the region division unit 122 divides the region including the travel route into a plurality of local regions having the same shape. Therefore, it is possible to suppress the calculation load related to the region division, as compared with a case in which the region is divided into a plurality of local regions having a variety of shapes.

Further, in this embodiment, since the region division unit 122 divides the region including the travel route into a plurality of local regions having the same area, it is possible to suppress the calculation load related to the region division, as compared with a case in which the region is divided into a plurality of local regions respectively having different areas.

Further, in this embodiment, the recalculation determination unit 124 determines that the recalculation of the travel route is necessary if the current position of the electric vehicle is not included in any of the local regions divided by the region division unit 122. Accordingly, when the electric vehicle is traveling in a region excessively deviating from the travel route, it is possible to reliably perform the recalculation of the travel route.

Second Embodiment

Next, a second embodiment of the travel route guide device according to the present invention will be described with reference to FIGS. 7 and 8. In this embodiment, a difference with the first embodiment described above will be mainly described and description of the same portions will be omitted.

The travel route guide device 100 of this embodiment differs from that in the first embodiment in the operation of the region division unit 122 and the constraint condition determination unit 123.

An operation of the region division unit 122 in this embodiment will be described with reference to FIGS. 7 and 8.

Figure 7:
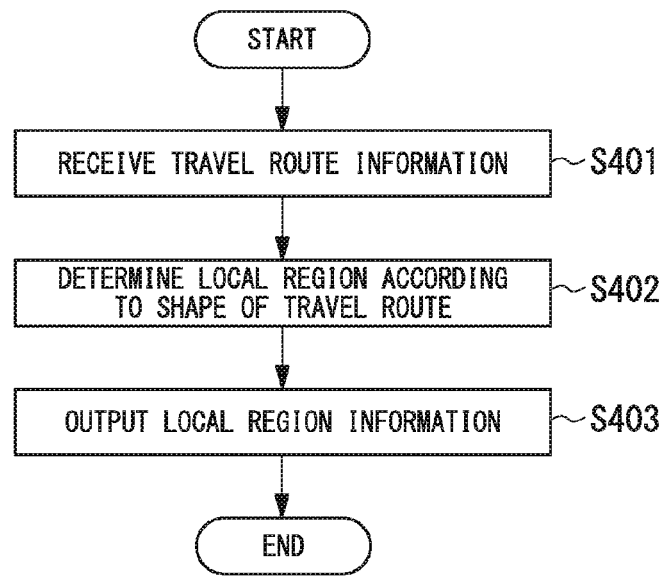
FIG. 7 is an operation flowchart of a region division unit in a second embodiment.
Figure 8:
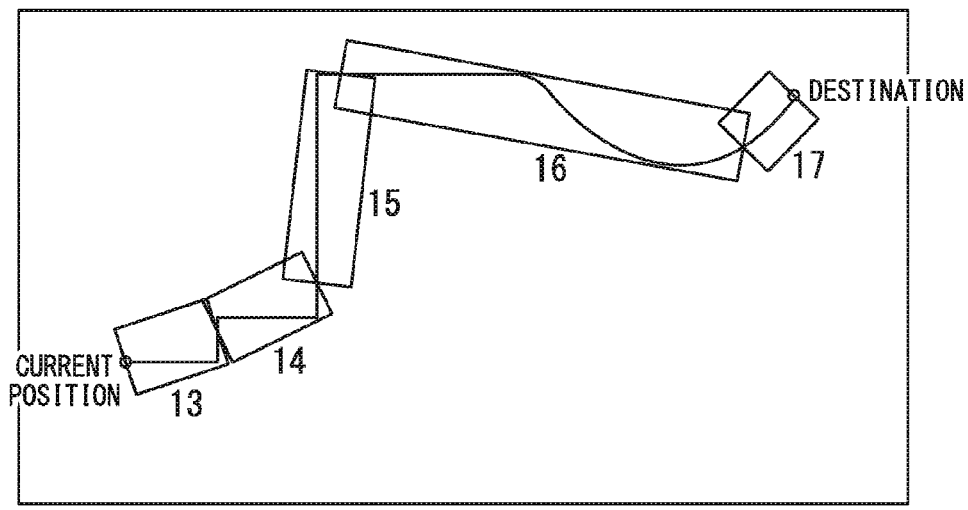
FIG. 8 is a diagram illustrating local region information in the second embodiment.

FIG. 7 is an operation flowchart of the region division unit 122 in this embodiment. FIG. 8 is a diagram illustrating local region information in this embodiment.

First, the region division unit 122 receives the travel route information output by the travel route calculation unit 121 from the travel route guide processing unit 111 (S401).

Then, the region division unit 122 performs the determination of the local region according to a shape of the travel route (S402). In this case, the region division unit 122 determines, as one local region, a band-like region having a predetermined width including a travel route from a start point of the travel route to any point advanced along the travel route, which is a last point satisfying two conditions (a2) and (b2) below.

(a2) The entire travel route connecting the two points is included inside a band-like region having a predetermined width having a straight line connecting the two points as a center line.

(b2) There is no congested section having a certain distance or more in the travel route connecting the two points.

Further, the region division unit 122 repeatedly performs a process of similarly determining a next local region using an end point of the travel route in the determined local region as a new start point. The region division unit 122 repeatedly performs such a determination of the local region until the entire travel route is determined as one of the local regions. The conditions in the determination of the local region may be only one of (a2) and (b2). In FIG. 8, band-like regions 13 to 17 indicated by a solid line are the determined local regions 13 to 17. The region division unit 122 adds identification information to each local region in passage order of the travel route, as in the first embodiment.

Finally, the region division unit 122 adds information in which coordinates of four vertices of each of the local regions 13 to 17 determined in S402 are associated with each local region, to the travel route information, and outputs the resultant information to the travel route guide processing unit 111 as the local region information (S403).

An operation of the constraint condition determination unit 123 in this embodiment will be described.

First, the constraint condition determination unit 123 receives the local region information output by the region division unit 122, and the values of the required time and the required power for traveling along the travel route output by the travel route calculation unit 121 from the travel route guide processing unit 111.

Then, the constraint condition determination unit 123 calculates each value obtained by multiplying the received value of the required time by an area fraction of each local region to the entire local region, and uses the value as an upper limit value in the constraint condition for the travel time which is a monitoring variable, in the corresponding local region. Further, the constraint condition determination unit 123 calculates each value obtained by multiplying the received value of the required power by an area fraction of each local region to the entire local region, and uses the value as an upper limit value in the constraint condition for the amount of power consumption which is a monitoring variable, in the corresponding local region.

Finally, the constraint condition determination unit 123 outputs the constraint conditions for the calculated travel time and the calculated amount of power consumption to the travel route guide processing unit 111.

According to the travel route guide device 100 as described above, the region division unit 122 determines the local regions to be band-like regions having a predetermined width as large as possible. Accordingly, as a result, a relatively straight section of the travel route becomes the same local region. That is, the region division unit 122 can perform the region division according to a static shape of the travel route.

Further, in this embodiment, since the region division unit 122 performs the region division according to a congestion situation of the travel route, it is possible to perform the region division according to a dynamic situation of the travel route.

Accordingly, since the travel route is divided according to characteristics of an influence of a shape or a situation of the travel route on power consumption, it is possible to achieve both of the validity of the recalculation determination in each local region and the suppression of the number of local regions.

Although the local region has been determined to be the band-like region having a predetermined width in this embodiment, the local region does not need to have the band shape. For example, the local region may have an elliptical shape having a predetermined long or short diameter or a three-dimensional shape having a predetermined width and height. It is possible to perform region division more appropriately in consideration of a difference in height of a sloping road or the like if the local region is determined to be a region having a three-dimensional shape.

Third Embodiment

Next, a travel route guide system according to the present invention will be described as a third embodiment with reference to FIGS. 9 and 10. In this embodiment, a difference with the first embodiment described above will be mainly described, and description of the same portions will be omitted.

The travel route guide system 200 of this embodiment has the configuration of the travel route guide device 100 in the first embodiment, which is distributed across an on-board unit 210 mounted in the electric vehicle and a management center device 220 for managing an operation of the electric vehicle so that the on-board unit 210 and the management center device 220 complement each other, and realizes travel route guide through cooperation of the on-board unit 210 and the management center device 220.

Figure 9:
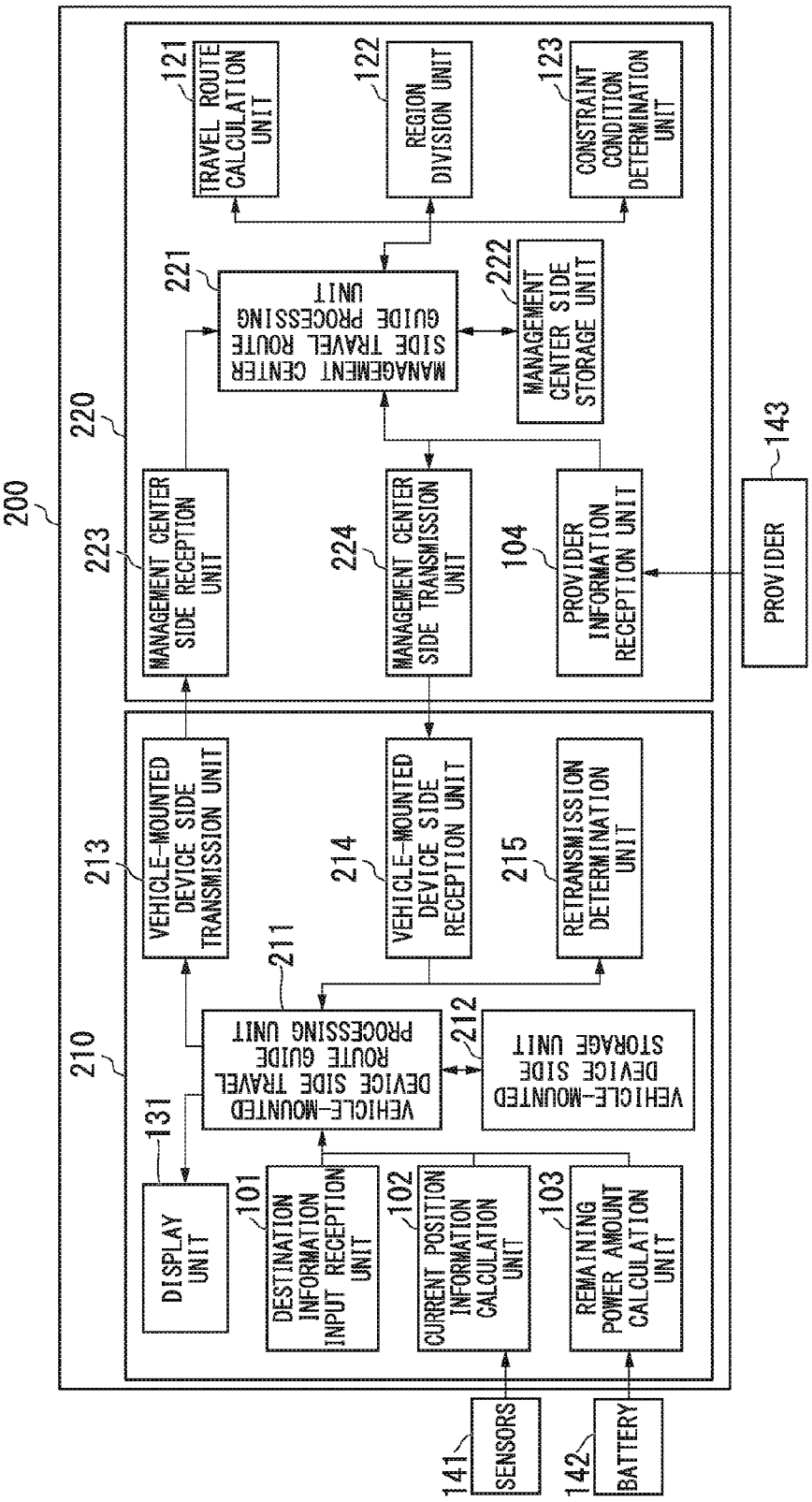
FIG. 9 is an entire configuration diagram of a travel route guide system in a third embodiment.
Figure 10:
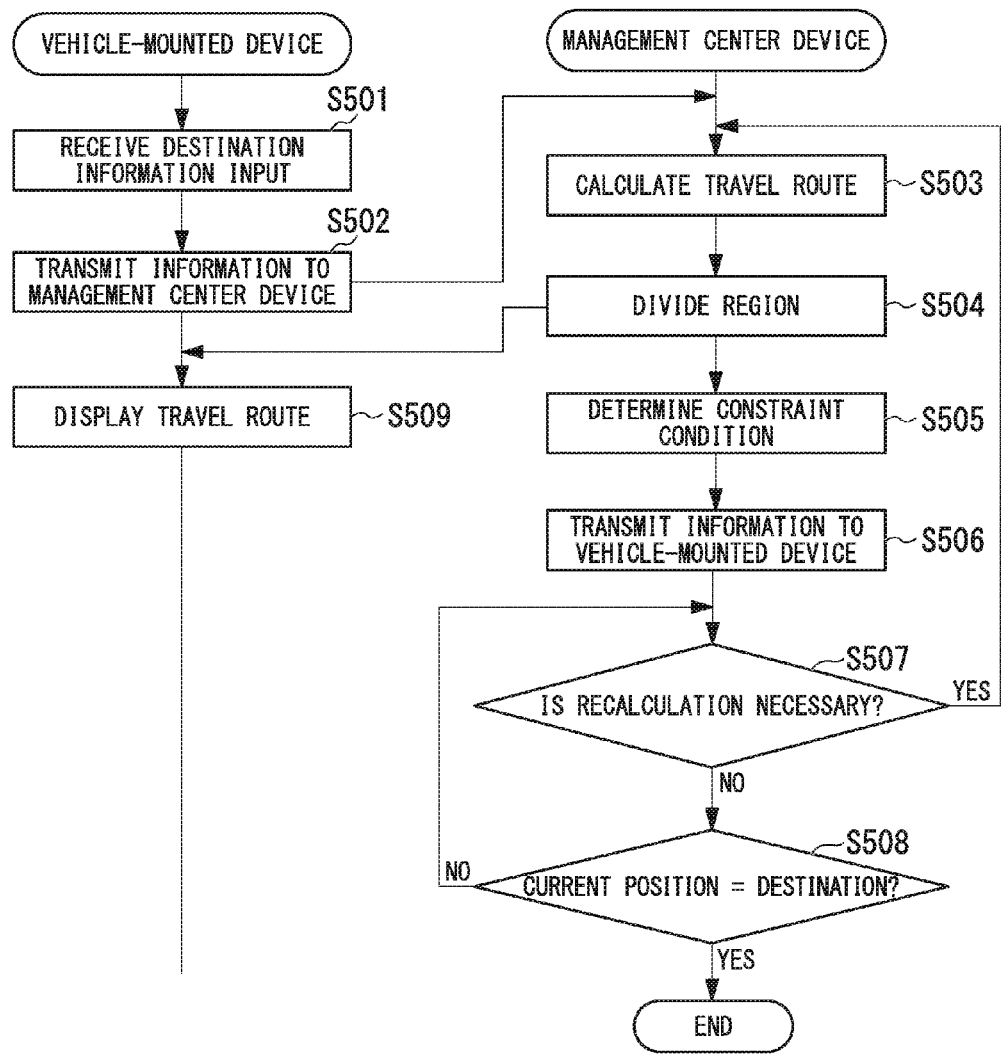
FIG. 10 is an operation flowchart of the travel route guide system in the third embodiment.

FIG. 9 is a diagram illustrating an entire configuration of the travel route guide system 200. The travel route guide system 200 includes the on-board unit 210 and the management center device 220. Further, the on-board unit 210 is connected to sensors 141 and a battery 142. Further, the management center device 220 is connected to a provider 143.

The on-board unit 210 includes a destination information input reception unit 101, a current position information calculation unit 102, a remaining power amount calculation unit 103, and a display unit 131 that are the same as those in the first embodiment, and an on-board unit side travel route guide processing unit 211, an on-board unit side storage unit 212, an on-board unit side transmission unit 213, and an on-board unit side reception unit 214, and a retransmission determination unit 215. Further, the destination information input reception unit 101, the current position information calculation unit 102, the remaining power amount calculation unit 103, and the display unit 131 cooperatively operate as in the first embodiment on the assumption that the on-board unit side travel route guide processing unit 211 is a processing unit corresponding to the travel route guide processing unit 111 in the first embodiment.

The management center device 220 includes a provider information reception unit 104, a travel route calculation unit 121, a region division unit 122, and a constraint condition determination unit 123 that are the same as those in the first embodiment, and a management center side travel route guide processing unit 221, a management center side storage unit 222, a management center side reception unit 223, and a management center side transmission unit 224. The provider information reception unit 104, the travel route calculation unit 121, the region division unit 122, and the constraint condition determination unit 123 cooperatively operate as in the first embodiment on the assumption that the management center side travel route guide processing unit 221 is a processing unit corresponding to the travel route guide processing unit 111 in the first embodiment.

The on-board unit side travel route guide processing unit 211 appropriately records the destination information, the current position information, and the remaining amount of power respectively received from the destination information input reception unit 101, the current position information calculation unit 102, and the remaining power amount calculation unit 103 in the storage unit 112.

Further, the on-board unit side travel route guide processing unit 211 instructs respective operations of the on-board unit side transmission unit 213, the on-board unit side reception unit 214, and the retransmission determination unit 215, outputs information required for the respective operations from the on-board unit side storage unit 212, receives information output as a result of the respective operations, or stores the information in the on-board unit side storage unit 212 as necessary.

Further, the on-board unit side travel route guide processing unit 211 appropriately outputs the information stored in the on-board unit side storage unit 212 to the display unit 131.

The on-board unit side storage unit 212 is a storage devices such as a hard disk or a flash memory. The on-board unit side storage unit 212 receives various types of information output from the destination information input reception unit 101, the current position information calculation unit 102, the remaining power amount calculation unit 103, the on-board unit side reception unit 214, and the retransmission determination unit 215 via the on-board unit side travel route guide processing unit, and stores the information.

The on-board unit side transmission unit 213 receives the destination information, the current position information, and the remaining amount of power from the on-board unit side travel route guide processing unit 211, and transmits electric vehicle information including such information to the management center side reception unit 223.

The on-board unit side reception unit 214 receives local region information and constraint conditions for the travel time and the amount of power consumption that are monitoring variables transmitted by the management center side transmission unit 224, and outputs the local region information and the constraint conditions to the on-board unit side travel route guide processing unit 211.

The retransmission determination unit 215 receives the current position information, and the local region information and the constraint conditions for the travel time and the amount of power consumption that are monitoring variables received by the on-board unit side reception unit 214 from the on-board unit side travel route guide processing unit 211, determines whether retransmission of the local region information including the travel route from the management center device 220 is necessary, and outputs a result of the determination to the on-board unit side travel route guide processing unit 211.

The management center side travel route guide processing unit 221 appropriately stores the road traffic information, the remaining power amount recovery facility information, the destination information, the current position information, and the remaining amount of power received from the provider information reception unit 104 and the management center side reception unit 223 in the management center side storage unit 222.

Further, the management center side travel route guide processing unit 221 instructs respective operations of the travel route calculation unit 121, the region division unit 122, the constraint condition determination unit 123, the management center side reception unit 223, and the management center side transmission unit 224, outputs information required for the respective operations from the management center side storage unit 222, receives information output as a result of the respective operations, or stores the information in the management center side storage unit 222 as necessary.

The management center side storage unit 222 is a storage devices such as a hard disk or a flash memory. The management center side storage unit 222 receives various types of information output from the provider information reception unit 104, the travel route calculation unit 121, the region division unit 122, the constraint condition determination unit 123, and the management center side reception unit 223 via the management center side travel route guide processing unit 221, and stores the information.

Further, the management center side storage unit 222 stores map information in advance.

The management center side reception unit 223 receives the destination information, the current position information, and the remaining amount of power transmitted by the on-board unit side transmission unit 213, and outputs these to the management center side travel route guide processing unit 221.

The management center side transmission unit 224 receives the local region information and the constraint conditions for the travel time and the amount of power consumption which are monitoring variables from the management center side travel route guide processing unit 221, and transmits the local region information and the constraint conditions to the on-board unit side reception unit 214.

Next, an operation of the travel route guide system 200 according to the third embodiment will be described with reference to FIG. 10. FIG. 10 is an operation flowchart of the travel route guide system 200. The flowcharts of FIGS. 2 and 10 have similar steps. S001 corresponds to S501, S002 corresponds to S503, S003 corresponds to S504, S004 corresponds to S505, S005 corresponds to S507, and S006 corresponds to S508. The management center side transmission unit 224 of the management center device 220 acquires information on the calculated travel route by the travel route calculation unit 121 from the management center side travel route guide processing unit 221, and transmits the information to the on-board unit 210. The on-board unit side travel route guide processing unit 211 acquires the information on the travel route via the on-board unit side reception unit 214, and outputs the information to the display unit 131 (S509).

That is, the travel route guide system in this embodiment is the same as that in the first embodiment in content of the operation, but is different in that an operation subject transitions from the on-board unit to the management center device 220 in S502 as a boundary and from the management center device 220 to the on-board unit in S506 as a boundary.

Thus, in this embodiment, the travel route calculation unit 121, the region division unit 122, and the constraint condition determination unit 123 are arranged in the management center device 220 and operated. Accordingly, it is possible to suppress a calculation load in the on-board unit.

It is not necessary for all of the travel route calculation unit 121, the region division unit 122, and the constraint condition determination unit 123 to be arranged in the management center device 220, and it is possible to suppress the calculation load in the on-board unit with only some of the units.

Although the embodiments of the present invention have been described above, the present invention is not limited thereto and can be appropriately changed without departing from the technical scope of this invention.

For example, in the first embodiment, the constraint condition determination unit 123 determines the upper limit value in the constraint conditions for the two monitoring variables such as the travel time and the amount of power consumption, but the present invention is not limited thereto. For example, the monitoring variable may be any one of the amount of power consumption and the travel time.

The constraint condition determination unit 123 may also determine a lower limit value as well as the upper limit value for one monitoring variable or may determine only the lower limit value.

Further, in the first embodiment, the constraint condition determination unit 123 uses the value obtained by dividing each of the values of the required time and the required power for traveling along the travel route output by the travel route calculation unit 121 by the number of local regions, as the upper limit value in the constraint conditions, but the present invention is not limited thereto.

The constraint condition determination unit 123 may receive a history of the current position information stored in the storage unit 112 from the travel route guide processing unit 111, calculate a distribution of a travel velocity of the electric vehicle from the history, and increase the upper limit value in the constraint conditions in proportion to this distribution or, conversely, decrease the upper limit value.

Accordingly, it is possible to determine the constraint conditions more appropriately according to acceleration and deceleration characteristics of the driver of the electric vehicle.

The travel route calculation unit 121, the constraint condition determination unit 123, and the recalculation determination unit 124 described above may perform the processes based on data previously calculated and accumulated or a simulation prediction result. For example, in a case that the electric vehicle traveled along the same route in the same time zone in the past, the travel route calculation unit 121 may output the travel route or may perform a simulation based on a traffic situation and calculate and output the travel route. Further, the constraint condition determination unit 123 may determine the required power of each local region previously calculated and accumulated based on a driving history or the like as the upper limit value in the constraint conditions, or may perform any simulation process to determine the constraint conditions. Further, the recalculation determination unit 124 may perform the determination of the recalculation using the travel time and the amount of power consumption after the electric vehicle has entered a local region specified based on the data previously calculated and accumulated or the simulation prediction result.

The above-described travel route guide device 100 includes a computer system therein. A process of the travel route guide described above is stored in the form of a program in a computer-readable recording medium, and the process is performed by the computer reading and executing this program. Here, the computer-readable recording medium may be a magnetic disk, a magneto-optical disc, a CD-ROM, a DVD-ROM, a semiconductor memory, or the like. Furthermore, this computer program may be distributed to a computer via a communication line, and the computer receiving this distribution may execute the program.

Further, the program may be transmitted from a computer system in which the program is stored in a storage device or the like to other computer systems via a transmission medium or by transmission waves in the transmission medium. Here, the "transmission medium" that transmits the program refers to a medium having a function of transmitting information, such as a network (communication network) such as the Internet or a communication line such as a telephone line. Further, the program may be a program for realizing some of the above-described functions. Alternatively, the program may be a program capable of realizing the above-described functions in combination with a program previously stored in the computer system, that is, a so-called differential file (differential program).

INDUSTRIAL APPLICABILITY

According to the travel route guide device, the travel route guide system, and the travel route guide method described above, it is possible to perform the recalculation of the travel route while suppressing the calculation load.

REFERENCE SIGNS LIST

100 Travel route guide device
101 Destination information input reception unit
102 Current position information calculation unit
103 Remaining power amount calculation unit
104 Provider information reception unit
111 Travel route guide processing unit
112 Storage unit
121 Travel route calculation unit
122 Region division unit
123 Constraint condition determination unit
124 Recalculation determination unit
131 Display unit
141 Sensors
142 Battery
143 Provider
200 Travel route guide system
210 On-board unit
211 On-board unit side travel route guide processing unit
212 On-board unit side storage unit
213 On-board unit side transmission unit
214 On-board unit side reception unit
215 Retransmission determination unit
220 Management center device
221 Management center side travel route guide processing unit
222 Management center side storage unit
223 Management center side reception unit
224 Management center side transmission unit

The invention claimed is:
1. A travel route guide device, comprising:
a travel route calculation unit configured to calculate a travel route from a current position to a destination based on current position information, destination information, and a remaining amount of power of an electric vehicle, and information on a remaining power amount recovery facility;
a region division unit configured to divide a region including the travel route calculated by the travel route calculation unit into a plurality of local regions;
a constraint condition determination unit configured to determine a constraint condition for a monitoring variable related to power consumption, for each of the local regions divided by the region division unit; and
a recalculation determination unit configured to monitor, for a traveling electric vehicle, the monitoring variable corresponding to the local region including a position of the electric vehicle, and request the travel route calculation unit to calculate the travel route when a value of the monitoring variable deviates from the constraint condition.

2. The travel route guide device according to claim 1, wherein the monitoring variable is either or both of an amount of power consumption and travel time.

3. The travel route guide device according to claim 1, wherein the region division unit divides a region including the travel route calculated by the travel route calculation unit into a plurality of local regions having a planar shape.

4. The travel route guide device according to claim 1, wherein the region division unit divides the region so that the plurality of local regions have the same shape.

5. The travel route guide device according to claim 4, wherein the region division unit divides the region so that the plurality of local regions have the same area.

6. The travel route guide device according to claim 1, wherein the region division unit divides a region including the travel route calculated by the travel route calculation unit into a plurality of local regions having a shape or an area according to a situation of the travel route.

7. The travel route guide device according to claim 6, wherein the situation of the travel route is either or both of a shape of the travel route and a congestion situation of the travel route.

8. The travel route guide device according to claim 1, wherein the recalculation determination unit requests the travel route calculation unit to calculate the travel route when a position of the electric vehicle is not included in any of the local regions.

9. The travel route guide device according to claim 1, wherein the constraint condition determination unit determines the constraint condition based on a driving history of the electric vehicle.

10. A travel route guide system comprising a management center device configured to manage an operation of an electric vehicle, and an on-board unit mounted in the electric vehicle, wherein the management center device comprises:
a management center side reception unit configured to receive electric vehicle information including current position information, destination information, and a remaining amount of power of the electric vehicle from the on-board unit;
a travel route calculation unit configured to calculate a travel route from a current position to a destination of the electric vehicle based on the electric vehicle information received by the management center-side reception unit and information on a remaining power amount recovery facility;
a region division unit configured to divide a region including a travel route calculated by the travel route calculation unit into a plurality of local regions;
a constraint condition determination unit configured to determine a constraint condition for a monitoring variable related to power consumption for each of the local regions divided by the region division unit; and
a management center side transmission unit configured to transmit management center processing information including the travel route calculated by the travel route calculation unit, the local regions divided by the region division unit, and the constraint condition for the monitoring variable determined by the constraint condition determination unit to the on-board unit, and the on-board unit includes:
an on-board unit side transmission unit configured to transmit the electric vehicle information to the management center device;
an on-board unit side reception unit configured to receive the management center processing information from the management center device; and
a retransmission determination unit configured to monitor the monitoring variable corresponding to the local region including a position of the electric vehicle based on the management center processing information received by the on-board unit side reception unit, and request the on-board unit side transmission unit to transmit the electric vehicle information to the management center device when a value of the monitoring variable deviates from the constraint condition.

11. A travel route guide system comprising a management center device configured to manage an operation of an electric vehicle, and an on-board unit mounted in the electric vehicle, wherein travel route guide system includes:
a travel route calculation unit configured to calculate a travel route from a current position to a destination based on current position information, destination information and a remaining amount of power of the electric vehicle, and information on a remaining power amount recovery facility;
a region division unit configured to divide a region including the travel route calculated by the travel route calculation unit into a plurality of local regions;
a constraint condition determination unit configured to determine a constraint condition for a monitoring variable related to power consumption, for each of the local regions divided by the region division unit; and
a recalculation determination unit configured to monitor, for a traveling electric vehicle, the monitoring variable corresponding to the local region including a position of the electric vehicle, and request the travel route calculation unit to calculate the travel route when a value of the monitoring variable deviates from the constraint condition, the travel route calculation unit, the region division unit, the constraint condition determination unit, and the recalculation determination unit being distributed across the management center device and the on-board unit.

12. A travel route guide method, comprising:
a travel route calculation step of calculating a travel route from a current position to a destination based on current position information, destination information, and a remaining amount of power of an electric vehicle, and information on a remaining power amount recovery facility;
a region division step of dividing a region including the travel route calculated in the travel route calculation step into a plurality of local regions;
a constraint condition determination step of determining a constraint condition for a monitoring variable related to power consumption, for each of the local regions divided in the region division step; and
a recalculation determination step of monitoring, for a traveling electric vehicle, the monitoring variable corresponding to the local region including a position of the electric vehicle, and determining that the travel route calculation step is to be performed again when a value of the monitoring variable deviates from the constraint condition.

* * * * *